United States Patent Office 3,168,040
Patented Feb. 2, 1965

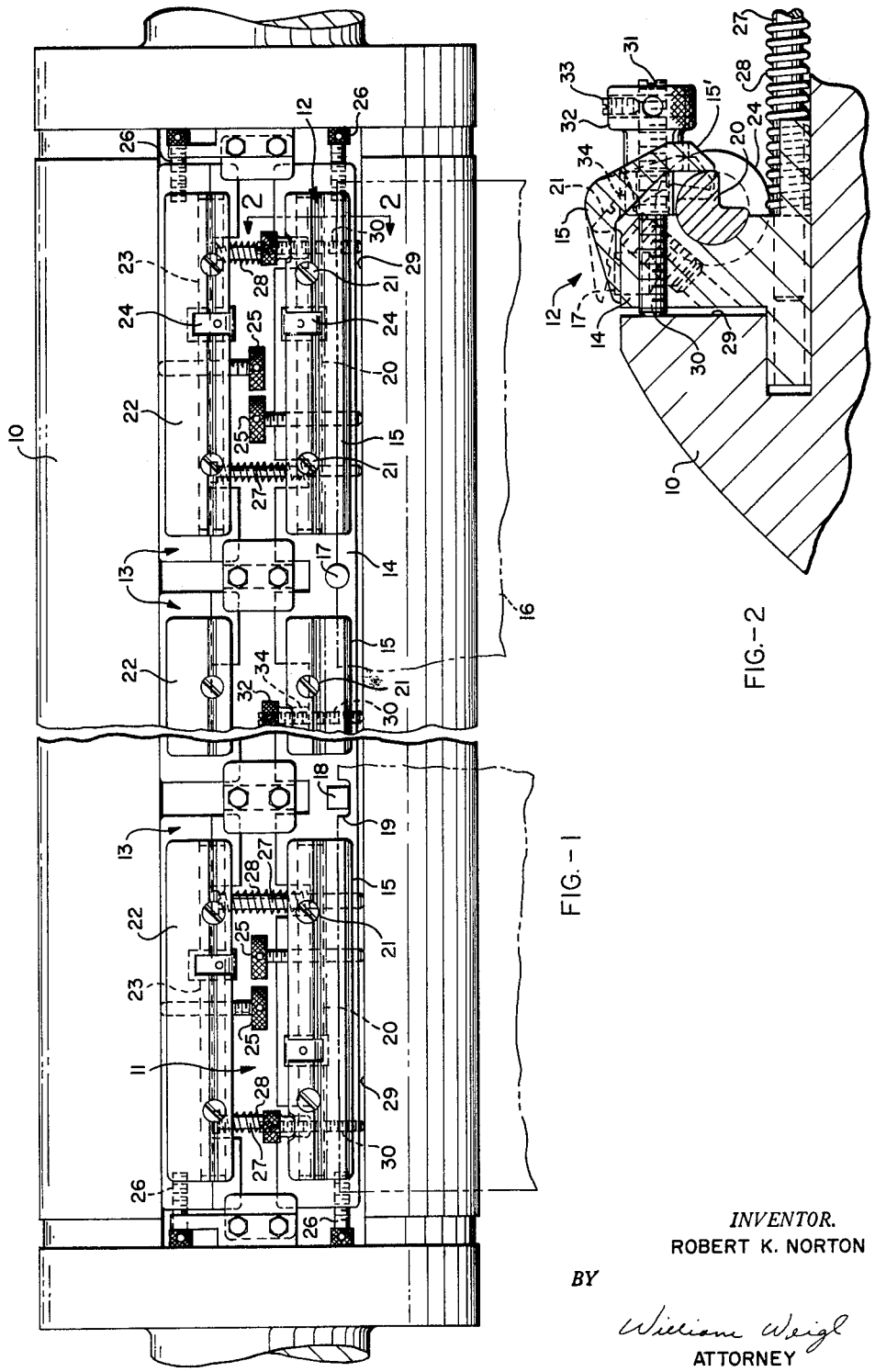

3,168,040
PLATE CLAMP REGISTERING MECHANISM
Robert K. Norton, Twinsburg, Ohio, assignor to Harris-Intertype Corporation, Cleveland, Ohio, a corporation of Delaware
Filed July 18, 1962, Ser. No. 210,632
10 Claims. (Cl. 101—415.1)

This invention relates generally to clamps for flexible printing plates, and in particular to means for rapidly and accurately registering such a plate clamp in an exact, predetermined position relative to its cylinder, whereby a plate properly registered to the clamp will thereby be properly registered to the cylinder and press.

Various systems have been proposed for registering printing plates to printing cylinders over the years. Whenever a plate clamp mounted on such a cylinder had plate aligning means thereon, it was nevertheless often found necessary to move the clamp relative to the cylinder once the plate had been locked thereto. Even the most perfect pre-register systems known to date are subject to occasional problems in that human error may cause an image to be slightly "off" with respect to the plate, or improper plate handling during installation on a cylinder may cause poor register. If proper register is not obtained upon installation, it is normal to move the plate clamp to rectify the situation. Movement of the plate clamp from its original position when installing the first of a group of plates naturally requires that the clamp be restored or reset to that position when the first printing plate is removed therefrom, in order that the next plate may be pre-registered to the cylinder.

Some proposals for resetting plate clamps were to use screws with micrometer settings lined up with a pointer, or to use feeler gauges for aligning the plate clamp with the cylinder body after the plate has been removed. While these have been effective to a degree, they have certain inherent disadvantages.

A serious disadvantage of micrometer adjusting screws is that wear or rough handling by pressmen would often destroy the accuracy of such screws, particularly since their threads must be held to very close tolerances and must be closely fitted. Rust, ink and various printing chemicals tend to get on the screw threads and dials and make micrometer settings impractical.

In those instances where attempts were made to restore the plate clamps to an original condition on the cylinder by means of feeler gauges, it was often found that dirt, ink, corrosion, machining inaccuracies, and damage to machined surfaces would prevent accurate re-alignment of the plate clamp with the cylinder after the mechanism had been in use awhile. The use of feeler gauges is subject to a still further disadvantage in that each operator has a different "feel," and the settings may vary from one shift to another. In both of the previously mentioned systems, the amount of time it took to reset the clamps on the cylinder was too great to warrant use of such pre-registering systems, and as a consequence, clamp register has been obtained by the trial-and-error method.

It is a principal object of this invention to enable quick and accurate restoration of the relationship of a plate clamp to its plate cylinder after a flexible printing plate has been removed therefrom.

A more specific object is to enable rapid make-ready through use of a plate pre-registering system employing plate clamps which can be quickly and accurately pre-positioned on a plate cylinder.

Still another object is to make provision for the occasional inadequacy of plate pre-register systems to compensate for unforseen register problems caused by human error in the plate making or plate handling process.

Other objects and advantages will be apparent from the following description in which reference is made to the accompanying drawings.

In the drawings:
FIG. 1 is a view of a printing press plate cylinder having plate clamps for receiving the leading and trailing edges of a flexible printing plate, and
FIG. 2 is an enlarged, cross-sectional fragmentary view of a portion of the plate clamp pre-registering means according to the invention, and is taken substantially along line 2—2 of FIG. 1.

According to the invention, a plate cylinder 10 is mounted for rotation in side frames (not shown), and carries a leading edge plate clamp 12 and a plurality of trailing edge plate clamps 13 in a gap 11. In that form of the invention illustrated herein, the leading edge plate clamp 12 includes an elongated bar 14 which acts as the lower jaw of the clamp, and a plurality of upper jaws 15 which are capable of being independently clamped upon a plate 16.

The plate 16 is shown in dot-dash lines in FIG. 1 as it is initially inserted between the jaws 14 and 15 of the plate clamp 12 and registered against a round register pin 17 and one side of a square register pin 18. In the form of register system shown herein, it will be seen that the pin 17 is encompassed by the plate on one-half of its circumference, thus providing both front and side register of the plate, while the square pin 18 provides front register of the plate only, since a notch 19 in the registered edge of the plate 16 is wider than the portion of the pin 18 engaged thereby. The pins 17 and 18 and their corresponding notches effectively provide what is commonly referred to as three-point register of the plate 16 to the plate clamp 12. It is to be understood that the plate 16 was previously prepared as a lithographic or relief printing plate of the flexible variety, with the image portions thereon being in exact registration with the register notches in the leading edge of the plate. I prefer that the plate be prepared in accordance with the method described in my co-pending U.S. patent application Ser. No. 660,688, filed May 21, 1957, and now abandoned. I wish it to be understood, however, that any plate registering system or plate preparation system may be employed with the invention described herein.

The plate 16, after being held in position by a pressman against the register pins 17 and 18 with jaws 15 open, is clamped to the leading edge plate clamp 12 by actuating each of the jaws 15 to clamp the plate 16 against the bar 14. Jaws 15 are actuated to locked position by rotation of a longitudinally grooved shaft 20. (See FIG. 2.) The groove of the shaft, when coinciding with the tail 15' of the jaw 15, enables the jaws to be opened in a clockwise direction by spring means (not shown). The jaws 15 are pivoted about round-headed screws 21 in conventional fashion. When the shaft 20 is actuated to the position shown in FIG. 2, the clamping edge of the upper jaws 15 are cammed to pivot counterclockwise about the heads of screws 21 to lock onto and grip the plate 16.

Once the leading edge of the plate 16 is gripped by the clamp 12, the cylinder is rotated until the plate 16 is wrapped about the cylinder under pressure from another cylinder. This wrapping takes place until only the trailing edge portion of the plate 16 remains free. The trailing edge of the plate is then tucked into the jaws of the trailing edge plate clamps 13 in similar fashion to the manner in which the leading edge was received by the clamp 12, with the exception that the trailing edge plate clamps 13 ordinarily will not require the use of plate pre-registering means such as the pins 17 and 18. Each clamp 13 includes an upper jaw 22 and a grooved shaft 23. The grooved shafts 20 and 23 of the clamps 12 and 13 respectively are actuated by engaging pins in radial holes of enlarged portions 24 of the shafts 20 and 23. If everything in the plate making process has been performed accurately from camera to the press, and if all the registering elements are in their exact pre-set positions, then the plate 16 should be properly located on the cylinder 10 when installed, so that the printing job may be run without any adjustment of the plate 16 on the cylinder. While this is ideal, it is not always possible for this to occur. Any slight error in the processing or mounting of the plate may cause or require some adjustment of either or both the leading edge clamp 12 or the trailing edge clamps 13 relative to the cylinder. In order to make positive movements of the plate clamps in tensioning a plate about the cylinder, conventional means such as jackscrews 25 are provided for adjusting the clamps 12 and 13 inwardly of the gap 11. In addition, jackscrews 26 are provided for the plate clamps to enable side adjustments thereof.

Pins 27 interconnect the leading and trailing edge plate clamps and have springs 28 surrounding them between the clamps. The springs 28 urge the clamps 12 and 13 toward the sides of the gap 11 and therefore maintain the tips of the jackscrews 25 against their respective gap sides.

It will be seen from FIG. 1 that the bar 14 is spaced slightly from the adjacent side or edge 29 of the body of the cylinder 10. This spacing enables the jackscrews 25 to be backed off to enable the plate clamp 12 to be positioned toward the adjacent side 29 a small amount. The present invention involves the use of means which predetermines the exact location or position of the bar 14 with respect to the adjacent edge 29 of the cylinder body. One such pre-positioning means is shown in FIG. 2 as being a gauge screw 30 which is threaded into and through the upper part of the bar 14. The end or tip of the screw 30 forms an abutment which engages the adjacent edge 29 of the cylinder body. It will be noted from FIG. 2 that the screw 30 is slotted as at 31 for purposes to be described later.

Each gauge screw 30, of which three are shown in FIG. 1, has an adjustable nut 32 mounted on one end. The leftward end surface of the nut forms an abutment which has a definite relationship to the abutting tip of screw 30, as will be seen. The nut 32 is threaded radially to receive a set screw 33 which is capable of locking the nut relative to the gauge screw 30. As shown in FIG. 2, a spacer 34 may be employed to surround a portion of the gauge screw 30. Actually, the spacer is used in the illustrated design merely because space limitations between the gauge screw 30 and the shaft 20 do not permit the nut 32 to reach beyond the shaft 20 to the bar 14 without sacrificing strength of the parts. The spacer 34 is flattened on the side next to the shaft 20 and has an opening therethrough permitting free passage of the screw 30. Each nut 32 is provided with radial pin-receiving holes to receive a tool, thus enabling the screws 30 to be backed off when the bar 14 is to be moved toward the adjacent edge of the cylinder body. This enables the springs 28 to urge the plate clamp 12 leftwardly as shown in FIG. 2. The leftward movement is permitted by the space between the bar 14 and the adjacent edge 29 of the cylinder body. The abutting tips of the screws 30 would "tend" to separate from the edge 29, but the springs 28 move the bar 14 leftwardly, instead.

Both ends of the spacer 34 and the portion of the bar 14 engaged by the spacer 34 are provided with accurate bearing surfaces. The abutment on the nut 32 is engageable with the right bearing surface of the spacer 34. This enables the nut 32 to be relatively tightened against the spacer 34 (and thus bar 14), to predetermine the amount that the abutting tip of the gauge screw 30 extends beyond the side of the bar 14 facing the adjacent edge 29 of the cylinder body. In this fashion, each gauge screw acts similarly to a feeler gauge, with the main difference being that the adjustment "feel" will always be almost identical, since the gauge screws 30 merely need be tightened to position. Once a gauge screw 30 is locked in abutment-engaging position as shown in FIG. 2, there need be no further adjustment, as is commonly required when using feeler gauges or micrometer gauge screws which align with micrometer markings on the cylinder or other member.

It will be seen that any slight inaccuracy in the machining of the edge 29 of the cylinder, or in the threads of the gauge screws 30 or the bar 14 can be compensated for very easily by merely loosening the set screw 33, repositioning the nut 32 relative to the gauge screw 30 by means of slot 31 and the radial holes in the nut, and again locking the set screw 33. The gauge screw nuts 32 may be factory-set and not tampered with for a long period. If any wear of the parts should occur, the nut 32 may be reset for another long period.

With the plate 16 installed in the clamps 12 and 13 of the cylinder 10, and with some minor inward adjustment of bar 14 being required in the event slight inaccuracies have occurred, the bar 14 may be moved away from the edge 29 by merely operating the various jackscrews 25 of both clamps in conventional fashion. It will be seen that the abutting tips of the gauge screws 30 will therefore move out of engagement with the adjacent side 29. When the plate 16 is removed and a subsequent printing job is to be run, the plate clamp 12 should first be restored to its original position with respect to the cylinder to enable full advantage to be taken of the plate pre-registering system provided by the pins 17 and 18 and their corresponding notches in the plates. This is accomplished by merely backing off the previously adjusted jackscrews 25, whereupon the springs 28 surrounding the pins 27 will urge the plate clamp 12 back toward its position until the tips of the gauge screws 30 abut the adjacent edge 29 of the cylinder body.

Let us assume, however, that when the plate 16 was first installed, it had to be moved in a direction toward the adjacent edge 29, or around the cylinder toward the trailing edge plate clamps 13. In this case, both the gauge screws 30 and the jackscrews 25 of clamp 12 would first have to be backed off until the springs 28 urged the bar 14 toward edge 29 to its proper register position. In this condition the abutting tips of the gauge screws 30 could provide the positive location of the bar 14 relative to the edge 29. Or, if desired, the jackscrews 25 could be used for this purpose, or both the jackscrews and gauge screws could be used. Screws 25 of clamp 13 would then be operated to urge the trailing edge of the plate inwardly of the gap. In this latter example, after a plate has been removed and the plate clamp 12 is to be restored to its original condition, each gauge screw 30 should be turned until the abutment on its nut 32 engages the bearing surface of the spacer 34 to cause it to bear snugly against its bearing surface formed on the bar 14. Once the gauge screw 30 is tight in the bar 14, i.e., with there being no space between the abutting and bearing surfaces of the nut 32, spacer 34 and bar 14, the tips of the screws 30 will protrude beyond the bar 14 to the same extent as previously, and the plate clamp 12 will have been restored to its predetermined orginal position.

It is obvious that whenever either of the side jackscrews 26 are operated to effect a side adjustment of the plate clamps 12 or 13, they must be restored also to position the pins 17 and 18 in their proper locations. Slight corrective measures are normally not required for side register in the system described.

Various modifications may be made in the details of construction without departing from the spirit and scope of the claims.

Having described my invention, I claim:

1. In a rotatable printing press cylinder having a body member and a longitudinal gap in the periphery thereof,
   (a) a plate clamp member mounted in and extending along one side of said gap and adapted to be adjusted generally laterally in opposite directions from a predetermined plate-receiving position spaced from said gap side, (b) first means for positively adjusting said clamp member away from said gap side, (c) second means for moving said clamp member toward said gap side, (d) plate registering elements mounted on said clamp member for registering an image-carrying flexible printing plate to said cylinder when said clamp member is located in said predetermined plate-receiving position, (e) a plurality of spaced gauging elements mounted on one of said members and each having a first abutment engageable with said body member and a second abutment engageable with said clamp member, said abutments, when engaged, serving to positively predetermine the plate-receiving position of the clamp member with respect to said gap side, and, (f) means for operating each gauging element in a manner normally tending to simultaneously disengage said abutments from said clamp and body members for enabling said second means to move said clamp member toward said gap side from its plate-receiving position, said gauging elements being constructed and arranged to restore said clamp member to its predetermined plate-receiving position upon re-engagement of said abutments.

2. The invention set forth in claim 1 wherein at least one of said abutments on each gauging element is adjustable relative to the other said abutment, and means for locking said adjustable abutment to its gauging element.

3. The invention set forth in claim 1 wherein each of said gauging elements comprises a gauge screw threaded through a portion of said clamp member and having a tip forming said first abutment engageable with said body member, a nut adjustably threaded on said screw and having a surface forming said second abutment engageable with said clamp member, and means for locking said nut relative to said screw.

4. The invention set forth in claim 3 including means on each gauge screw providing a tool-receiving portion for enabling operation of each screw independently of its nut.

5. The invention set forth in claim 1 wherein said first means for adjusting said clamp member comprises a plurality of spaced jackscrews, and wherein said second means for moving said clamp member comprises spring means biasing the clamp member toward said gap side.

6. In a rotatable printing press cylinder having a body member and longitudinal gap in the periphery thereof, (a) a plate clamp member mounted in and extending along one side of said gap and adapted to be adjusted laterally in opposite directions from a pre-determined plate-receiving position spaced from said gap side, said clamp member including a bar and a movable jaw mounted on said bar for clamping an image-carrying flexible printing plate between said jaw and bar, (b) first means for positively moving said bar away from said gap side, (c) second means for moving said bar toward said gap side, (d) plate registering elements mounted on said bar for registering the printing plate and the image thereon to said cylinder when said bar is located in said predetermined plate-receiving position, (e) means for operating said jaw to clamp the plate against said bar, (f) a plurality of spacer gauging elements mounted on one of said members and each having a first abutment engageable with said body member and a second abutment engageable with said bar, said abutments, when engaged, serving to positively predetermine the plate-receiving position of the bar with respect to said gap side, and, (g) means for operating each gauging element in a manner normally tending to simultaneously disengage said abutments from said bar and said body member for enabling said second means to move said bar toward said gap side from its plate-receiving position, said gauging elements being constructed and arranged to restore said clamp member to its predetermined plate-receiving position upon re-engagement of said abutments.

7. The invention set forth in claim 6 wherein said first means includes a plurality of spaced jackscrews, and wherein said second means includes a plurality of spaced springs biasing said bar toward the gap side.

8. The invention set forth in claim 6 wherein at least one of said abutments on each gauging element is adjustable relative to the other said abutment, and means for locking said adjustable abutment to its gauging element.

9. The invention set forth in claim 6 wherein each of said gauging elements includes a screw threaded through said bar and having a tip forming said first abutment engageable with said body member and a nut threaded on said screw and having a surface forming said second abutment engageable with said bar, said nut being adjustable along said screw, and means for locking said nut in adjusted position on said screw.

10. The invention set forth in claim 9 wherein the means for operating each gauging element comprises tool-receiving portions on each nut for operating each nut and screw jointly relative to the bar when the nut is locked to the screw.

References Cited in the file of this patent

UNITED STATES PATENTS

| | | |
|---|---|---|
| 1,391,117 | Huebner | Sept. 20, 1921 |
| 2,386,214 | Harrold | Oct. 9, 1945 |
| 2,621,592 | Faeber | Dec. 16, 1952 |